US011245920B2

(12) United States Patent
Coban et al.

(10) Patent No.: US 11,245,920 B2
(45) Date of Patent: Feb. 8, 2022

(54) ESCAPE CODE CODING FOR MOTION VECTOR DIFFERENCE IN VIDEO CODING

(71) Applicant: QUALCOMM Incorporated, San Diego, CA (US)

(72) Inventors: Muhammed Zeyd Coban, Carlsbad, CA (US); Hongtao Wang, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/000,034

(22) Filed: Aug. 21, 2020

(65) Prior Publication Data
US 2021/0058640 A1 Feb. 25, 2021

Related U.S. Application Data

(60) Provisional application No. 62/893,705, filed on Aug. 29, 2019, provisional application No. 62/891,161, filed on Aug. 23, 2019.

(51) Int. Cl.
H04N 11/02 (2006.01)
H04N 19/52 (2014.01)
H04N 19/176 (2014.01)

(52) U.S. Cl.
CPC ........... H04N 19/52 (2014.11); H04N 19/176 (2014.11)

(58) Field of Classification Search
CPC ...................................................... H04N 19/52
USPC ....................................... 375/240.01–240.29
See application file for complete search history.

(56) References Cited

U.S. PATENT DOCUMENTS

| 10,757,437 | B2 * | 8/2020 | Chou | H04N 19/433 |
| 2013/0235936 | A1 * | 9/2013 | Campbell | H04N 19/467 |
| | | | | 375/240.16 |
| 2015/0264355 | A1 * | 9/2015 | Hsiang | H04N 19/517 |
| | | | | 375/240.02 |
| 2019/0037231 | A1 * | 1/2019 | Ikai | H04N 19/52 |

FOREIGN PATENT DOCUMENTS

| EP | 3162061 B1 | 1/2020 | |
| WO | 2016003819 A1 | 1/2016 | |
| WO | WO-2016003819 A1 * | 1/2016 | ........... H04N 19/184 |

OTHER PUBLICATIONS

Bross B., et al., "Versatile Video Coding (Draft 7)", Joint Video Experts Team (JVET) of ITU-T SG 16 WP 3 and ISO/IEC JTC 1/SC29/WG 11, JVET-P2001-vE, 16th Meeting, Geneva, CH, Oct. 1-11, 2019, 494 pages.

(Continued)

Primary Examiner — Leron Beck
(74) Attorney, Agent, or Firm — Shumaker & Sieffert, P.A.

(57) ABSTRACT

A device for coding video data is configured to code a motion vector difference (MVD) value using a codeword prefix and a codeword suffix. Based on an absolute value, minus 2, of the MVD value being 131070 or greater, the codeword prefix of the MVD value is equal to 1111 1111 1111 1111 and the codeword suffix is coded using the fixed length code.

20 Claims, 8 Drawing Sheets

(56) References Cited

OTHER PUBLICATIONS

Budagavi M., et al., "Coeff_abs_Level_Remaining Maximum Codeword Length Reduction", Document: JCTVC-J0142, 10th Meeting, Stockholm, SE, Jul. 11-20, 2012, (Joint Collaborative Team on Video Coding (JCT-VC) of ITU-T SG 16 WP 3 and ISO/IEC JTC 1/ SC 29/WG 11), pp. 1-14.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

Coban M., et al., CE7-related: Golomb-Rice/Exponential Golomb Coding for abs_Remainder and dec_abs_Level Syntax Elements, JVET-M0470, Joint Video Experts Team (JVET) of ITU-T SG 16 WP 3 and ISO/IEC JTC 1/SC 29/WG 11, 13th Meeting, Marrakech, MA, Jan. 9-18, 2019, pp. 1-4.

Deng Z., et al., "Non-CE4: Cleanups on MVD Ranges", JVET-O0567, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-4.

Huang H., et al., "Non-CE4: 32 Bits Coding for abs_mvd_minus2", JVET-P0090, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-3.

International Search Report and Written Opinion—PCT/US2020/047545—ISA/EPO—dated Oct. 12, 2020 15 Pages.

ITU-T H.265, Series H: Audiovisual and Multimedia Systems, Infiastructure of Audiovisual Services—Coding of Moving Video, High Efficiency Video Coding, The International Telecommunication Union, Jun. 2019, 696 Pages.

Karczewicz M., et al., "AHG18: Limiting the Worst-Case Length for Coeff_abs_Level_Remaining Syntax Element to 32 bits", Joint Collaborative Team on Video Coding (JCT-VC) of ITU-T SG 16 WP 3 and ISO/IEC JTC 1/SC 29/WG 11, JCTVC-Q0131, 17th Meeting: Valencia, ES, Mar. 27-Apr. 4, 2014, pp. 1-4.

Sharman K., et al., "AHG18: Worst-case Escape Code Length Mitigation," Document: JCTVC-Q0073, 17, JCT-VC Meeting, Mar. 27, 2014-Apr. 4, 2014, Valencia, ES (Joint Collaborative Team on Video Coding of ISO/IEC JTC1/SC29/WG11 and ITU-T SG.16 WP 3), URL: http://wftp3.itu.int/av-arch/jctvc-site/, No. JCTVC-Q0073-V2, Mar. 24, 2014 (Mar. 24, 2014), XP030115973, 6 pages.

Coban M., et al., CE7-related: Golomb-Rice/Exponential Golomb Coding for abs_Remainder and dec_abs_Level Syntax Elements, The Joint Video Exploration Team of ISO/IEC JTC 1/SC 29/WG 11 and ITU-T SG.16, JVET-M0470, Jan. 14, 2019, pp. 1-3, Retrieved from the Internet: URL http://phenix.int-evry.fr/jvet/doc_end_user/documents/13_Marrakech/wg11/JVET-M0470-v3.zip JVET-M0470-WD-text.docx.

\* cited by examiner

| Input Value | Codeword prefix | Codeword suffix | Prefix code length | Suffix code length | Total codeword length |
|---|---|---|---|---|---|
| [0,1] | 0 | x | 1 | 1 | 2 |
| [2,5] | 10 | xx | 2 | 2 | 4 |
| [6,13] | 110 | xxx | 3 | 3 | 6 |
| [14,29] | 1110 | xxxx | 4 | 4 | 8 |
| [30,61] | 1 1110 | x xxxx | 5 | 5 | 10 |
| [62,125] | 11 1110 | xx xxxx | 6 | 6 | 12 |
| [126,253] | 111 1110 | xxx xxxx | 7 | 7 | 14 |
| [254,509] | 1111 1110 | xxxx xxxx | 8 | 8 | 16 |
| [510,1021] | 1 1111 1110 | x xxxx xxxx | 9 | 9 | 18 |
| ... | ... | ... | ... | ... | ... |
| [65534, 131069] | 1111 1111 1111 1110 | xxxx xxxx xxxx xxxx | 16 | 16 | 32 |
| *[131070, 131072]* | 1111 1111 1111 1111 | 0000 0000 0000 00xx | 16 | 16 | 32 |

FIG. 3

ESCAPE CODE CODING FOR MOTION VECTOR DIFFERENCE IN VIDEO CODING

This application claims the benefit of U.S. Provisional Patent Application 62/891,161, filed Aug. 23, 2019, and U.S. Provisional Patent Application 62/893,705, filed Aug. 29, 2019, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding of escape codes representing non-context coded portions of motion vector differences (MVDs) in a video coding process. This disclosure describes examples of an entropy decoding process that converts a binary representation to a series of non-binary valued quantized coefficients. The corresponding entropy encoding process, which is the reverse process of entropy decoding, is implicitly specified and therefore is part of the techniques of this disclosure as well. The techniques of this disclosure may be applied to any of the existing video codecs, such as High Efficiency Video Coding (HEVC), or be used as a coding tool in the Versatile Video Coding (VVC) standard currently being developed, and to other future video coding standards.

In one example, this disclosure describes a method of coding video data, the method comprising: coding a motion vector difference (MVD) value using a codeword prefix and a codeword suffix, wherein based on an absolute value, minus 2, of the MVD value being 131070 or greater, the codeword prefix of the MVD value is equal to 1111 1111 1111 1111 and the codeword suffix is coded using a fixed-length code.

In another example, this disclosure describes a device for coding video data, the device comprising: a memory to store the video data; and one or more processors implemented in circuitry, the one or more processors configured to: code a motion vector difference (MVD) value using a codeword prefix and a codeword suffix, wherein based on an absolute value, minus 2, of the MVD value being 131070 or greater, the codeword prefix of the MVD value is equal to 1111 1111 1111 1111 and the codeword suffix is coded using a fixed-length code.

In another example, this disclosure describes a device for coding video data, the device comprising: means for storing the video data; and means for coding a motion vector difference (MVD) value using a codeword prefix and a codeword suffix, wherein based on an absolute value, minus 2, of the MVD value being 131070 or greater, the codeword prefix of the MVD value is equal to 1111 1111 1111 1111 and the codeword suffix is coded using a fixed-length code.

In another example, this disclosure describes a computer-readable storage medium having stored thereon instructions that, when executed, cause one or more processors to code a motion vector difference (MVD) value using a codeword prefix and a codeword suffix, wherein based on an absolute value, minus 2, of the MVD value being 131070 or greater, the codeword prefix of the MVD value is equal to 1111 1111 1111 1111 and the codeword suffix is coded using a fixed-length code.

The details of one or more examples are set forth in the accompanying drawings and the description below. Other features, objects, and advantages will be apparent from the description, drawings, and claims.

BRIEF DESCRIPTION OF DRAWINGS

FIG. 3 is a conceptual diagram illustrating codeword examples.

DETAILED DESCRIPTION

Figure 1:
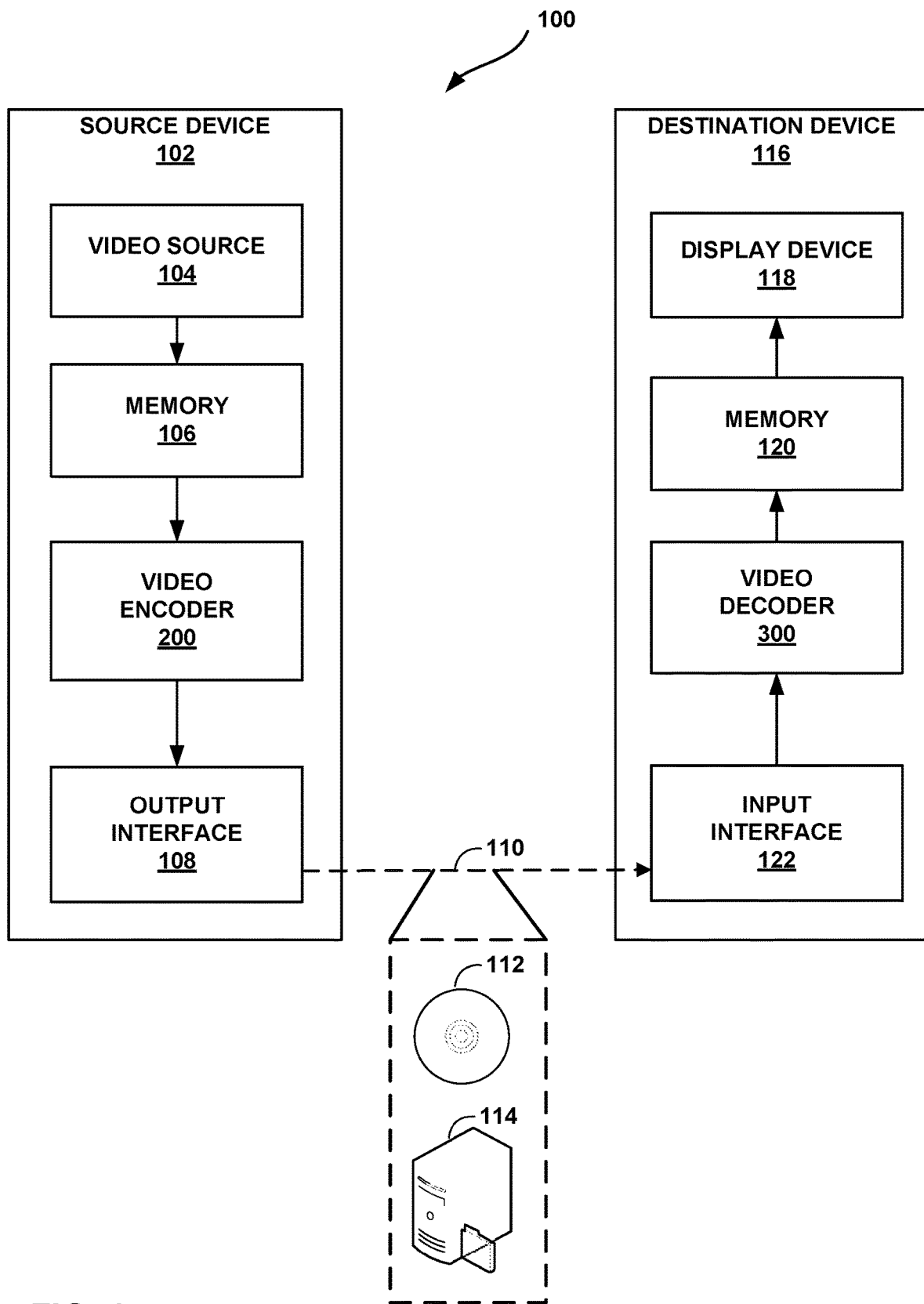
FIG. 1 is a block diagram illustrating an example video encoding and decoding system that may perform the techniques of this disclosure.

A video encoder may use inter-prediction to generate a prediction block based on samples of a reference picture.

The video encoder may then generate residual data that indicate differences between the prediction block and a current block of a current picture. The video encoder may then encode the residual data. The video encoder may also determine a motion vector that indicates a displacement between the location in the current picture of the current block and a location in the reference picture corresponding to the prediction block. A video decoder may use the motion vector determine the location in the reference picture corresponding to the prediction block and generate the prediction block. The video decoder may use the residual data and the prediction block to reconstruct the current block of the current picture.

To increase the efficiency of signaling the motion vector, the video encoder may determine a motion vector predictor and a motion vector difference (MVD). The video encoder may determine the motion vector predictor based on motion vectors of one or more blocks that neighbor the current block. The MVD indicates a difference between the motion vector for the current block and the motion vector predictor. The video encoder may signal the MVD and sufficient data to enable the video decoder to determine the motion vector predictor. The MVD may include two MVD values, one indicating a horizontal difference and one indicating a vertical difference.

In "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"), MVD values may range from $-2^{17}$ to $2^{17}-1$. Instead of directly signaling an MVD value (e.g., a horizontal difference or a vertical difference), the video encoder may signal a greater-than-0 syntax element that indicates whether the MVD value is or is not greater than 0. If the MVD value is greater than 0, the video encoder may signal a greater-than-1 syntax element that indicates whether the MVD value is greater than 1. The video encoder may also signal a syntax element indicating a sign of the MVD value. Furthermore, if the MVD value is greater than 1, the video encoder may signal an absolute value of a remaining value. The remaining value is equal to the MVD value minus 2.

In VVC Draft 6, the remaining value is binarized as a 1$^{st}$-order exponential-Golomb codeword using a maximum of 34 bits. The video encoder may then apply bypass encoding to the codeword. Conversely, the video decoder may apply bypass decoding to recover the codeword. The video decoder may then determine the MVD value based on the codeword.

However, it may be desirable to use a codeword with a maximum length of 32 bits instead of a codeword with a maximum length of 34 bits. Using a codeword with a maximum length of 32 bits may be more efficient because a 32-bit codeword may be byte-aligned. Moreover, using a codeword with a maximum length of 32 bits instead of a codeword with a maximum length of 34 bits may be more efficient because 2 fewer bits are used to represent the codeword, which ultimately may reduce the number of bits produced by bypass coding the codeword.

The techniques of this disclosure may address this problem and may therefore increase efficiency. In accordance with one example of this disclosure, a video coder (such as a video encoder or a video decoder) may code (e.g., encode or decode) an MVD value (e.g., a horizontal difference or a vertical difference) using a codeword prefix and a codeword suffix. Based on an absolute value, minus 2, of the MVD value being 131070 or greater, the codeword prefix of the MVD value is equal to 1111 1111 1111 1111 and the codeword suffix is coded using a fixed length code. As described herein, this may allow the codeword for an MVD value to be represented using a maximum of 32 bits instead of a maximum of 34 bits.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, mobile devices (e.g., notebook (i.e., laptop) computers, tablet computers, telephone handsets such smartphones, etc.), set-top boxes, televisions, cameras, display devices, digital media players, video gaming consoles, broadcast receiver devices, video streaming devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding of escape codes representing non-context coded portions of MVDs using exponential-Golomb codes but other types of codes (e.g., in addition to or instead of exponential-Golomb codes) may be used. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for coding of escape codes representing non-context coded portions of MVDs using exponential-Golomb codes. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (e.g., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereof, such as the multi-view and/or scalable video coding extensions. Alternatively, video encoder 200 and video decoder 300 may operate according to other proprietary or industry standards, such as ITU-T H.266, also referred to as Versatile Video Coding (VVC). VVC Draft 6 is a recent draft of the VVC standard. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data. Video decoder 300 may decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As mentioned above, video encoder 200 and video decoder 300 may apply CABAC encoding and decoding to values of syntax elements. To apply CABAC encoding to a syntax element, video encoder 200 may binarize the value of the syntax element to form a series of one or more bits, which are referred to as "bins." In addition, video encoder 200 may identify a coding context. The coding context may identify probabilities of bins having particular values. For instance, a coding context may indicate a 0.7 probability of coding a 0-valued bin and a 0.3 probability of coding a 1-valued bin. After identifying the coding context, video encoder 200 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 200 may repeat these steps with the interval being the sub-interval associated with the value of the encoded bit. When video encoder 200 repeats these steps for the next bin, video encoder 200 may use modified probabilities based on the probabilities indicated by the identified coding context and the actual values of bins encoded.

When video decoder 300 performs CABAC decoding on a value of a syntax element, video decoder 300 may identify a coding context. Video decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 300 may decode a bin having the value associated with the lower sub-interval. If the encoded value is within the upper sub-interval, video decoder 300 may decode a bin having the value associated with the upper sub-interval. To decode a next bin of the syntax element, video decoder 300 may repeat these steps with the interval being the sub-interval that contains the encoded value. When video decoder 300 repeats these steps for the next bin, video decoder 300 may use modified probabilities based on the probabilities indicated by the identified coding context and the decoded bins. Video decoder 300 may then de-binarize the bins to recover the value of the syntax element.

In some instances, video encoder 200 may encode bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 200 and video decoder 300. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half. Thus, bypass coded data may be considered to be non-context coded.

As mentioned above, a video coder (e.g., video encoder 200 or video decoder 300) may apply inter prediction to generate a prediction block for a video block of a current picture. For instance, the video coder may apply inter prediction to generate a prediction block for a prediction block of a CU. If the video coder applies inter prediction to generate a prediction block, the video coder generates the prediction block based on decoded samples of one or more reference pictures. Typically, the reference pictures are pictures other than the current picture. In some video coding specifications, a video coder may also treat the current picture itself as a reference picture. The video coder may determine one or more reference picture lists. Each of the reference picture lists includes zero or more reference pictures. One of the reference picture lists may be referred to as Reference Picture List 0 (RefPicList0) and another reference picture list may be referred to as Reference Picture List 1 (RefPicList1).

The video coder may apply uni-directional inter prediction or bi-directional inter prediction to generate a prediction block. When the video coder applies uni-directional inter prediction to generate a prediction block for a video block, the video coder determines a single reference block for the video block based on samples of a single reference picture. The reference block may be a block of samples that is similar to the prediction block. Furthermore, when the video coder applies uni-directional inter prediction, the video coder may set the prediction block equal to the reference block. When the video coder applies bi-directional inter prediction to generate a prediction block for a video block, the video coder determines two reference blocks for the video block. In some examples, the two reference blocks are in reference pictures in different reference picture lists. Additionally, when the video coder applies bi-directional inter-prediction, the video coder may determine the prediction block based on the two reference blocks. For instance, the video coder may determine the prediction block such that each sample of the prediction block is a weighted average of corresponding samples of the two reference blocks. Reference list indicators may be used to indicate which of the reference picture lists includes reference pictures used for determining reference blocks.

As mentioned above, a video coder may determine a reference block based on samples of a reference picture. In some examples, the video coder may determine the reference block such that each sample of the reference block is equal to a sample of the reference picture. In some examples, as part of determining a reference block, the video coder may interpolate samples of the reference block from samples of the reference picture. For example, the video coder may determine that a sample of the prediction block is a weighted average of two or more samples of the reference picture.

In some examples, when video encoder 200 performs uni-directional inter prediction for a current block of a current picture, video encoder 200 identifies a reference block within one or more reference pictures in one of the reference picture lists. For instance, video encoder 200 may search for a reference block within the one or more reference pictures in the reference picture list. In some examples, video encoder 200 uses a mean squared error or other metric to determine the similarity between the reference block and the current block Furthermore, video encoder 200 may determine motion parameters for the current block. The motion parameters for the current block may include a motion vector and a reference index. The motion vector may indicate a spatial displacement between a position of the current block within the current picture and a position of the reference block within the reference picture. The reference index indicates a position within the reference picture list of the reference frame that contains the reference picture list. The prediction block for the current block may be equal to the reference block.

When video encoder 200 performs bi-directional inter prediction for a current block of a current picture, video encoder 200 may identify a first reference block within reference pictures in a first reference picture list ("list 0") and may identify a second reference block within reference pictures in a second reference picture list ("list 1"). For instance, video encoder 200 may search for the first and second reference blocks within the reference pictures in the first and second reference picture lists, respectively. Video encoder 200 may generate, based at least in part on the first and the second reference blocks, the prediction block for the current block. In addition, video encoder 200 may generate a first motion vector that indicates a spatial displacement between the current block and the first reference block. Video encoder 200 may also generate a first reference index that identifies a location within the first reference picture list of the reference picture that contains the first reference block. Furthermore, video encoder 200 may generate a second motion vector that indicates a spatial displacement between the current block and the second reference block. Video encoder 200 may also generate a second reference index that identifies a location within the second reference picture list of the reference picture that includes the second reference block.

When video encoder 200 performs uni-directional inter prediction on a current block, video decoder 300 may use the motion parameters of the current block to identify the reference block of the current block. Video decoder 300 may then generate the prediction block of the current block based on the reference block. When video encoder 200 performs bi-directional inter prediction to determine a prediction block for a current block, video decoder 300 may use the motion parameters of the current block to determine two reference blocks. Video decoder 300 may generate the prediction block of the current block based on the two reference samples of the current block.

Video encoder 200 may signal motion parameters of a block in various ways. Such motion parameters may include motion vectors, reference indexes, reference picture list indicators, and/or other data related to motion. In some examples, video encoder 200 and video decoder 300 may use motion prediction to reduce the amount of data used for signaling motion parameters. Motion prediction may include the determination of motion parameters of a block (e.g., a PU, a CU, etc.) based on motion parameters of one or more other blocks. There are various types of motion prediction. For instance, merge mode and advanced motion vector prediction (AMVP) mode are two types of motion prediction.

In merge mode, video encoder 200 generates a candidate list. The candidate list includes a set of candidates that indicate the motion parameters of one or more source blocks. The source blocks may spatially or temporally neighbor a current block. Furthermore, in merge mode, video encoder 200 may select a candidate from the candidate list and may use the motion parameters indicated by the selected candidate as the motion parameters of the current block. Video encoder 200 may signal the position in the candidate list of the selected candidate. Video decoder 300 may determine, based on information obtained from a bitstream, the index into the candidate list. In addition, video decoder 300 may generate the same candidate list and may determine, based on the index, the selected candidate. Video decoder 300 may then use the motion parameters of the selected candidate to generate a prediction block for the current block.

Skip mode is similar to merge mode. In skip mode, video encoder 200 and video decoder 300 generate and use a candidate list in the same way that video encoder 200 and video decoder 300 use the candidate list in merge mode. However, when video encoder 200 signals the motion parameters of a current block using skip mode, video encoder 200 does not signal any residual data for the current block. Accordingly, video decoder 300 may determine a prediction block for the current block based on one or more reference blocks indicated by the motion parameters of a selected candidate in the candidate list. Video decoder 30 may then reconstruct samples in a coding block of the current block such that the reconstructed samples are equal to corresponding samples in the prediction block of the current block.

AMVP mode is similar to merge mode in that video encoder 200 may generate a candidate list for a current block and may select a candidate from the candidate list. However, for each respective reference block used in determining a prediction block for the current block, video encoder 200 may signal a respective motion vector difference (MVD) for the current block, a respective reference index for the current block, and a respective candidate index indicating a selected candidate in the candidate list. An MVD for a block may indicate a difference between a motion vector of the block and a motion vector of the selected candidate. The reference index for the current block indicates a reference picture from which a reference block is determined.

Furthermore, when AMVP mode is used, for each respective reference block used in determining a prediction block for the current block, video decoder 300 may determine an MVD for the current block, a reference index for the current block, and a candidate index and a motion vector prediction (MVP) flag. Video decoder 300 may generate the same candidate list and may determine, based on the candidate index, a selected candidate in the candidate list. As before, this candidate list may include motion vectors of neighboring blocks that are associated with the same reference index as well as a temporal motion vector predictor which is derived based on the motion parameters of the neighboring block of the co-located block in a temporal reference picture. Video decoder 300 may recover a motion vector of the current block by adding the MVD to the motion vector indicated by the selected AMVP candidate. That is, video decoder 300 may determine, based on a motion vector indicated by the selected AMVP candidate and the MVD, the motion vector of the current block. Video decoder 300 may then use the recovered motion vector or motion vectors of the current block to generate prediction blocks for the current block.

When a video coder (e.g., video encoder 200 or video decoder 300) generates an AMVP candidate list for a current block, the video coder may derive one or more AMVP candidates based on the motion parameters of reference blocks (e.g., spatially-neighboring blocks) that contain locations that spatially neighbor the current PU and one or more AMVP candidates based on motion parameters of PUs that temporally neighbor the current PU. The candidate list may include motion vectors of reference blocks that are associated with the same reference index as well as a temporal motion vector predictor which is derived based on the motion parameters (i.e., motion parameters) of the neighboring block of the co-located block in a temporal reference picture. This disclosure may use the term "temporal motion vector predictor" to refer to a block that is in a different time instance than the current block and is used for motion vector prediction.

In VVC Draft 6, an MVD value is 18 bits and ranges from $-2^{17} \leq MVD \leq 2^{17}-1$. An MVD value is coded with 2 context-coded bins representing greater than 0 (gt0) and greater than 1 (gt1) followed by a bypass-coded absolute remaining value abs(MVD)−2 if gt1 is 1. Finally, the sign of the MVD is coded as a single bypass-coded bit. With 18-bit MVD values, the largest value of abs(MVD)−2 can be $2^{17}-2=131070$. Currently in VTM6.0 (virtual test model 6.0), the remaining value abs(MVD)−2 is coded with EG1 (i.e., an exponential Golomb code with order 1). The length of this maximum value coded using an EG1 code is 34 bits (0x3fffc0000).

It may be desirable to have a maximum code length of 32 bits. Because the maximum value of the remaining value of abs(MVD)−2 is known, the prefix portion of the codeword can be limited to allow signalling of a maximum value of the syntax element, e.g., as shown in the equation below.

maximumPrefixLength=32−MAX_MVD_DYNAMIC_RANGE where MAX_MVD_DYNAMIC_RANGE is 17 and maximumPrefixLength indicates a maximum prefix length. When this prefix length is reached, the corresponding suffix length is then given by:

suffixLength=MAX_MVD_DYNAMIC_RANGE−rParam where rParam is k, i.e., order of EGk codes. For MVD coding, k is equal to 1. For a maximum prefix length of 32−17=15, the corresponding suffix length would be 17−1=16. Basically, the prefix portion of the EG(1) codewords grow until the prefix portion hits the maximumPrefixLength. After that, the prefix code length does not grow, and escape codes are coded using the fixed length code utilizing truncated unary prefix code.

Figure 2:
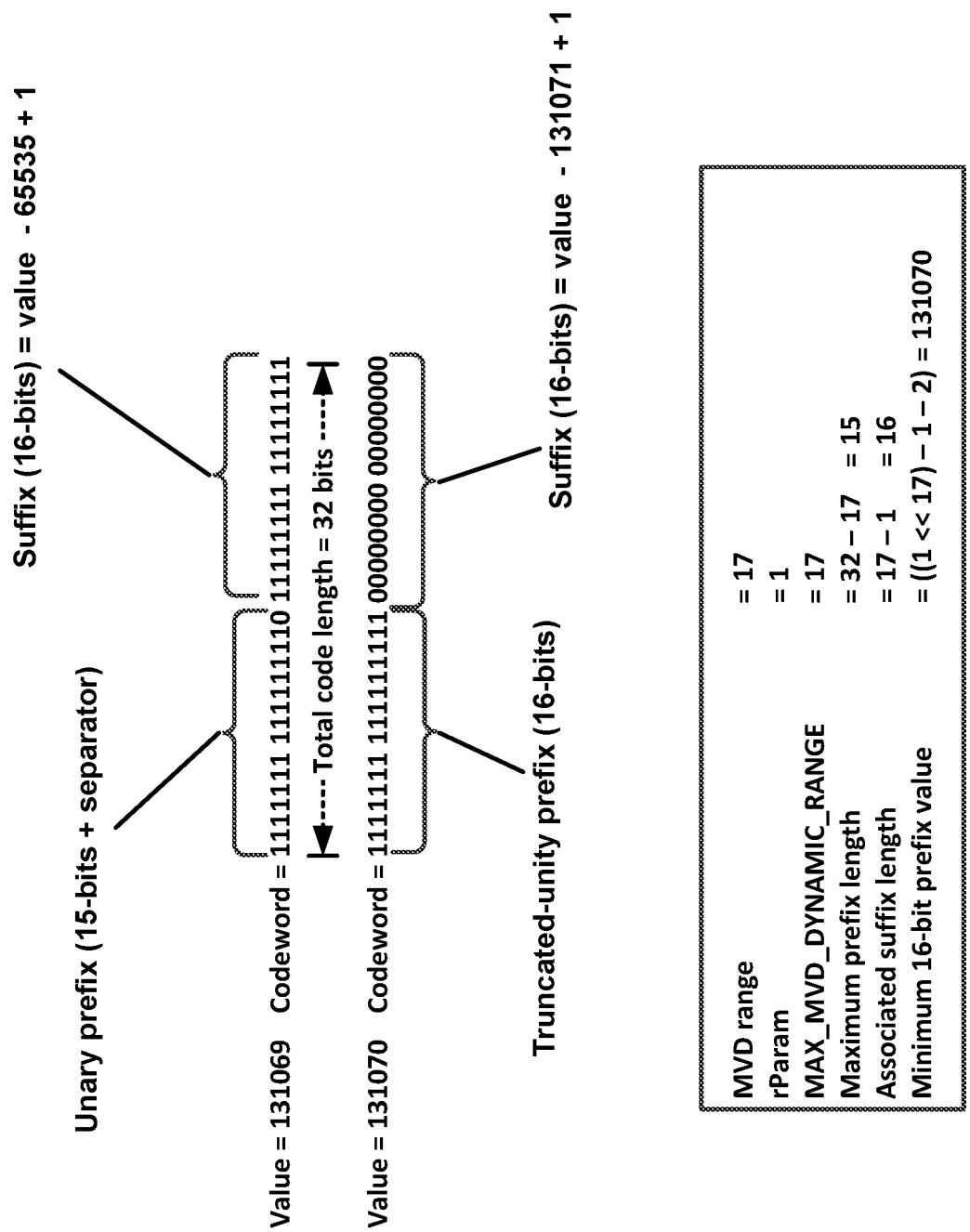
FIG. 2 is a conceptual diagram illustrating an example of coding in accordance with one or more techniques of this disclosure.

FIG. 2 is a conceptual diagram illustrating an example of coding in accordance with one or more techniques of this disclosure. As shown in the example of FIG. 2, all codewords are coded using EG(1) codes until the largest codeword within the 32-bit range can be coded (e.g., 131069). After that, the codeword switches to fixed prefix codeword with a fixed length suffix.

FIG. 3 is a conceptual diagram illustrating codeword examples. FIG. 3 illustrates codeword examples for values that are the maximum value that can be represented by a 32 bit EG(1) codeword (131069), and representation of 131070 value using 32 bits, that uses escape code coding with a 16 bit prefix and a suffix using truncated unary code. Because the maximum prefix length is known at the start of encoding/decoding, the prefix can be coded using truncated-unary coding, omitting the separator if the maximum prefix length is reached. In other words, it is not necessary to use a 0 at the end of the prefix. Truncated unary code is shown with bold italics in the table of FIG. 3.

Using the scheme described above, the input values covering the full range of the MVD remaining part (which may be the bypass coded part of the MVD value) are tabulated as shown in FIG. 3. All codewords from 0 to 131069 are identical to EG(1) codewords. The only exception is the 131070 to 131072 codewords that utilize the truncated unary prefix with 16-bit suffix.

In this scheme, there may be a maximum dynamic range of 17 and a threshold for switching from Golomb-Rice coding to Exponential-Golomb coding may be 0. The RiceParameter (EG parameter) is set to 1. An example process performed by video decoder 300 for the described scheme can be described by the code below:

```
unsigned decodeRemAbsEP( )
{
    unsigned goRicePar = 1;
    int maxLog2DynamicRange = 17
    unsigned prefix = 0;
    const unsigned maxPrefix = 32 − maxLog2DynamicRange;
    unsigned codeWord = 0;
```

```
do
{
  prefix++;
  codeWord = decodeBinEP( );
}
while( codeWord && prefix < maxPrefix );
prefix -=1 - codeWord;
unsigned length = goRicePar, offset;
offset = ( ( ( 1 << prefix ) - 1 ) << goRicePar );
length += ( prefix ==( 32 - maxLog2DynamicRange ) ?
maxLog2DynamicRange - goRicePar : prefix);
return offset + decodeBinsEP( length );
}
```

Example code performed by video encoder 200 for coding a value of "bins" is:

```
void encodeRemAbsEP( unsigned bins )
{
  int maxLog2DynamicRange = 17;
  unsigned goRicePar = 1;
  const unsigned maxPrefixLength = 32 -
  maxLog2DynamicRange;
    unsigned prefixLength = 0;
    unsigned codeValue = ( bins >>
  goRicePar );
    unsigned suffixLength;
    if( codeValue >= ( ( 1 << maxPrefixLength ) - 1 ) )
    {
    prefixLength = maxPrefixLength;
    suffixLength = maxLog2DynamicRange;
    }
    else
    {
        while( codeValue > ( ( 2 << prefixLength ) - 2 ) )
        {
        prefixLength++;
        }
        suffixLength = prefixLength + goRicePar + 1; //+1 for
        the separator bit
    }
    const unsigned totalPrefixLength = prefixLength;
    const unsigned bitMask = ( 1 << goRicePar )
    - 1;
    const unsigned prefix = ( 1 <<
    totalPrefixLength ) - 1;
    const unsigned suffix = ( ( codeValue -
    ( (1 << prefixLength ) - 1 ) ) << goRicePar ) | ( bins &
    bitMask );
    encodeBinsEP( prefix, totalPrefixLength ); //prefix
    encodeBinsEP( suffix, suffixLength ); //separator,
    suffix, and rParam bits
  }
}
```

This scheme can be expanded to higher range MVD values by adjusting the dynamic range parameter to the corresponding dynamic range of the MVD value.

In some examples, an MVD component (e.g., an x or y component) has the range of [−131072, 131071], inclusive. In such examples, each MVD component value is coded as gt0+gt1+(abs(MVD)−2). The gt0 and gt1 flags (e.g., greater than 0 and greater than 1 flags, respectively) are coded separately. The methods of coding gt0 and gt1 may be context-based CABAC coding, bypass coding or any other entropy coding methods. The "abs(MVD)−2" has the range of [0, 131070], inclusive. In this example, all codewords of "abs(MVD)−2" from 0 to 131069 are identical to EG(1) codewords. The value 131070 is coded as shown in the following table. A codeword prefix of 1111111111111111 is coded and since 131070 is the only value with this prefix, no codeword suffix is needed.

TABLE 1

| | Coding method of the value 131070 | | | | |
|---|---|---|---|---|---|
| Input Value | Codeword prefix | Codeword suffix | Prefix code length | Suffix code length | Total codeword length |
| [131070] | 1111 1111 1111 1111 | N/A | 16 | 0 | 16 |

Alternatively (or additionally), in addition to gt0 and gt1 context coded flags, gt2 flags can be coded with or without context to reduce the value of the codeword to be coded from MVD-2 to MVD-3, enabling coding of full range with EG(1) codes.

Thus, in accordance with the techniques of this disclosure, video encoder 200 or video decoder 300 may code an MVD value using a codeword prefix and a codeword suffix. Based on an absolute value, minus 2, of the MVD value being 131070 or greater, the codeword prefix of the MVD value is equal to 1111 1111 1111 1111 and the suffix is coded using a fixed length code. In some examples, video encoder 200 or video decoder 300 may code an MVD value using a codeword prefix, wherein based on an absolute value, minus 2, of the MVD value being 131070, the codeword prefix of the MVD value is equal to 1111 1111 1111 1111 and no codeword suffix is coded.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 4:
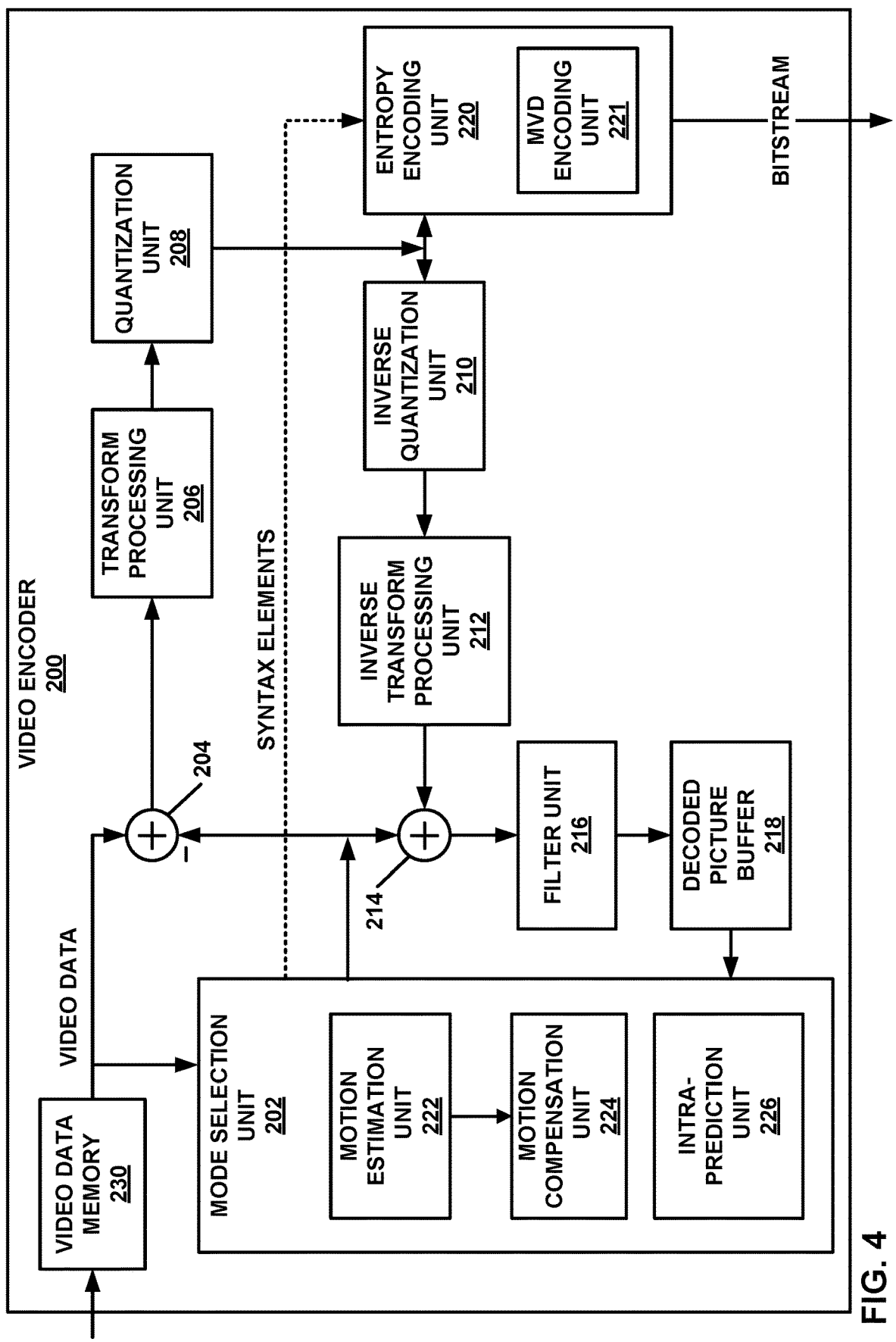
FIG. 4 is a block diagram illustrating an example video encoder that may perform the techniques of this disclosure.

FIG. 4 is a block diagram illustrating an example video encoder 200 that may perform the techniques of this disclosure. FIG. 4 is provided for purposes of explanation and should not be considered limiting of the techniques as broadly exemplified and described in this disclosure. For purposes of explanation, this disclosure describes video encoder 200 in the context of video coding standards such as the HEVC/H.265 video coding standard and the VVC/H.266 video coding standard in development. However, the techniques of this disclosure are not limited to these video coding standards and are applicable generally to video encoding and decoding.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and may provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

In the example of FIG. 4, entropy encoding unit 220 includes an MVD encoding unit 221 that is configured to encode syntax elements representing MVDs. Although not shown in the example of FIG. 4, entropy encoding unit 220 may include units for encoding other types of syntax elements. In some examples, MVD encoding unit 221 is implemented using circuitry specific to encoding syntax elements representing MVDs. In other examples, the same circuitry may be used to encode syntax elements representing MVDs and other syntax elements. In accordance with a technique of this disclosure, MVD encoding unit 221 may encode an MVD value using a codeword prefix and a codeword suffix. Based on an absolute value, minus 2, of the MVD value being 131070 or greater, the codeword prefix of the MVD value is equal to 1111 1111 1111 1111 and the codeword suffix is coded using a fixed-length code.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a MV and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Thus, video encoder 200 represents an example of a device configured to encode video data including a memory configured to store video data, and one or more processing units implemented in circuitry and configured to encode an MVD value using a codeword prefix and a codeword suffix. Based on an absolute value, minus 2, of the MVD value being 131070 or greater, the codeword prefix of the MVD value is equal to 1111 1111 1111 1111 and the codeword suffix is coded using a fixed length code. In some examples, video encoder 200 may encode an MVD value using a codeword prefix. Based on an absolute value, minus 2, of the MVD value being 131070, the codeword prefix of the MVD value is equal to 1111 1111 1111 1111 and no codeword suffix is encoded.

Figure 5:
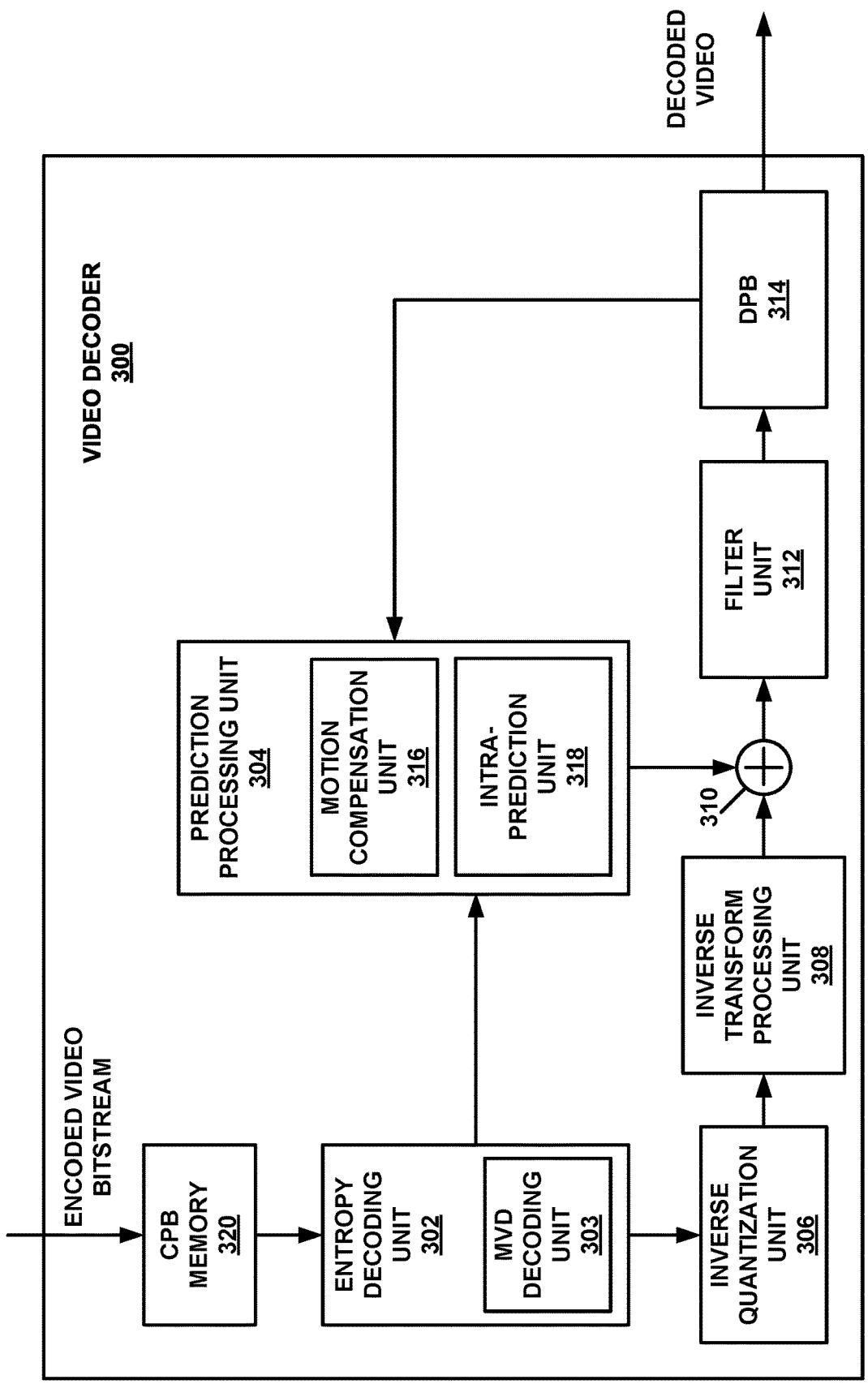
FIG. 5 is a block diagram illustrating an example video decoder that may perform the techniques of this disclosure.

FIG. 5 is a block diagram illustrating an example video decoder 300 that may perform the techniques of this disclosure. FIG. 5 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

In the example of FIG. 5, entropy decoding unit 302 includes an MVD decoding unit 303 that is configured to decode syntax elements representing MVDs. Although not shown in the example of FIG. 5, entropy decoding unit 302 may include units for encoding other types of syntax elements. In some examples, MVD decoding unit 303 is implemented using circuitry specific to decoding syntax elements representing MVDs. In other examples, the same circuitry may be used to decode syntax elements representing MVDs and other syntax elements. In accordance with a technique of this disclosure, MVD decoding unit 303 may decode an MVD value using a codeword prefix and a codeword suffix. Based on an absolute value, minus 2, of the MVD value being 131070 or greater, the codeword prefix of the MVD value is equal to 1111 1111 1111 1111 and the codeword suffix is coded using a fixed-length code.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to decode an MVD value using a codeword prefix and a codeword suffix. Based on an absolute value, minus 2, of the MVD value being 131070 or greater, the codeword prefix of the MVD value is equal to 1111 1111 1111 1111 and the codeword suffix is coded using a fixed length code. In some examples, video decoder 300 may decode an MVD value using a codeword prefix, wherein based on an absolute value, minus 2, of the MVD value being 131070, the codeword prefix of the MVD value is equal to 1111 1111 1111 1111 and no codeword suffix is coded.

Figure 6:
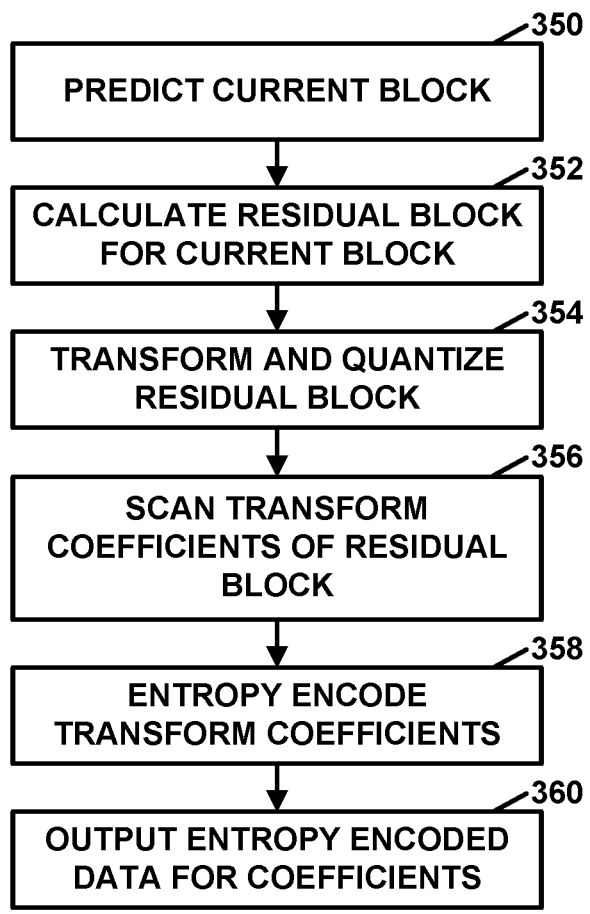
FIG. 6 is a flowchart illustrating an example method for encoding a current block.

FIG. 6 is a flowchart illustrating an example method for encoding a current block. The current block may include a current CU. Although described with respect to video encoder 200 (FIGS. 1 and 4), it should be understood that other devices may be configured to perform a method similar to that of FIG. 6.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize transform coefficients of the residual block (354). Next, video encoder 200 may scan the quantized transform coefficients of the residual block (356). During the scan, or following the scan, video encoder 200 may entropy encode the transform coefficients (358). For instance, video encoder 200 may entropy encode an MVD value represented using a codeword prefix and codeword suffix according to a scheme of this disclosure. For example, video encoder 200 may encode the transform coefficients using CAVLC or CABAC. In some examples, video encoder 200 may decode an MVD value using a codeword prefix, wherein based on an absolute value, minus 2, of the MVD value being 131070, the codeword prefix of the MVD value is equal to 1111 1111 1111 1111 and no codeword suffix is coded. Video encoder 200 may then output the entropy encoded data of the block (360).

Figure 7:
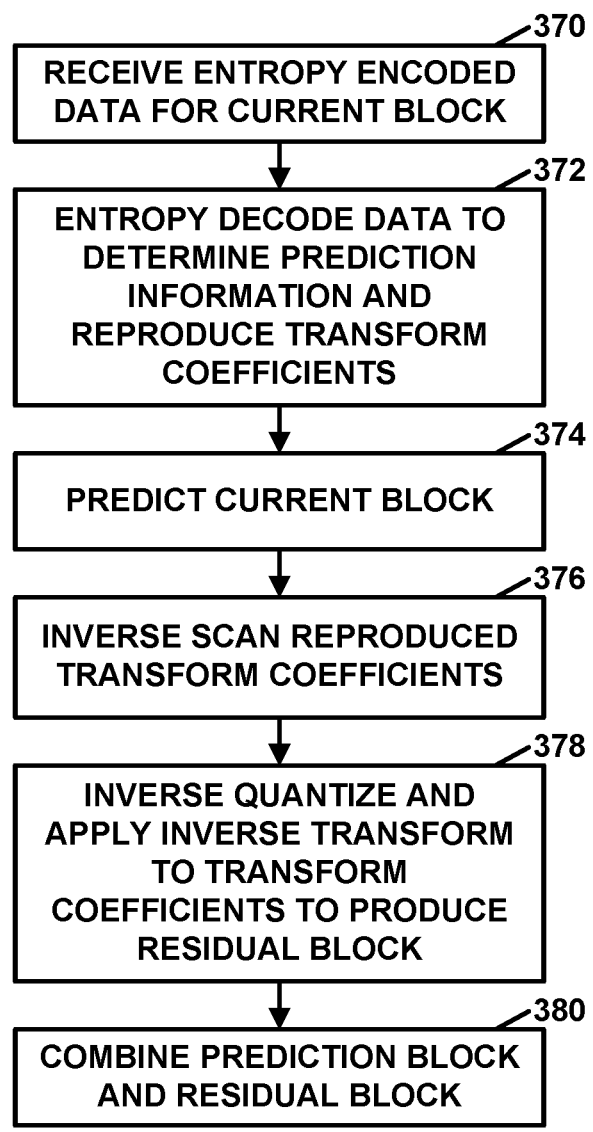
FIG. 7 is a flowchart illustrating an example method for decoding a current block of video data.

FIG. 7 is a flowchart illustrating an example method for decoding a current block of video data. The current block may include a current CU. Although described with respect to video decoder 300 (FIGS. 1 and 5), it should be understood that other devices may be configured to perform a method similar to that of FIG. 7.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). For instance, video decoder 300 may entropy decode an MVD value represented using a codeword prefix and codeword suffix according to a scheme of this disclosure. In some examples, video decoder 300 may decode an MVD value using a codeword prefix, wherein based on an absolute value, minus 2, of the MVD value being 131070, the codeword prefix of the MVD value is equal to 1111 1111 1111 1111 and no codeword suffix is coded. Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 8:
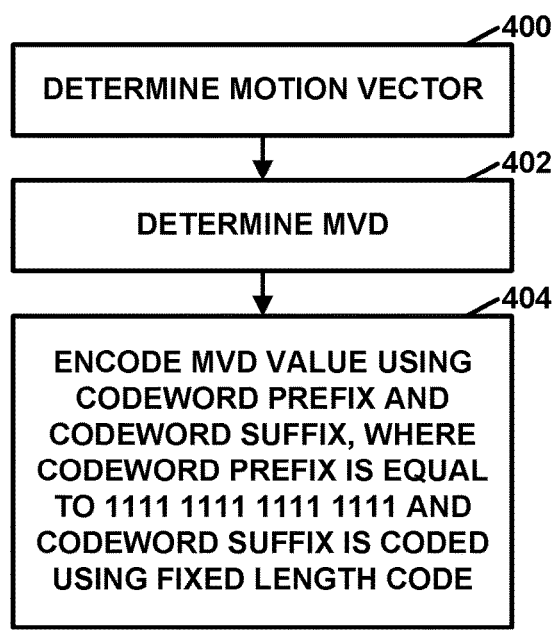
FIG. 8 is a flowchart illustrating an example method for encoding video data in accordance with one or more techniques of this disclosure.

FIG. 8 is a flowchart illustrating an example method for encoding video data in accordance with one or more techniques of this disclosure. In the example of FIG. 8, video encoder 200 (e.g., motion estimation unit 222 of video encoder 200) may determine a motion vector for a block of the video data (400). Video encoder 200 may also determine an MVD value based on a difference between the motion vector for the block and a predicted motion vector for the block (402). Video encoder 200 may determine the motion vector and MVD according to an AMVP process, e.g., as described elsewhere in this disclosure.

Furthermore, video encoder 200 (e.g., MVD encoding unit 221 of entropy encoding unit 220 (FIG. 4)) may encode an MVD value using a codeword prefix and a codeword suffix (404). The MVD value may indicate a remaining value for a horizontal or vertical component of the MVD. If the MVD value is 131070 or greater, the codeword prefix of the MVD value is equal to 1111 1111 1111 1111 and the codeword suffix is encoded using a fixed-length code. The MVD value may be a horizontal or vertical component of an MVD that indicates a difference between a motion vector for a block of the video data and a predicted motion vector for the block Alternatively, if the absolute value, minus 2, of the second MVD value is less than 131070, a codeword representing the MVD value is a first-order exponential Golomb codeword. In some examples, a maximum dynamic range of the MVD value is 17, regardless of a bit depth of the video data.

As part of encoding the MVD value, video encoder 200 may encode a greater-than-0 value that indicates whether the MVD value is greater than 0. Based on the MVD value being greater than 0, video encoder 200 may encode a greater-than-1 value that indicates whether the MVD value is greater than 1. Additionally, video encoder 200 may encode an absolute remaining value of the MVD value. The absolute remaining value of the MVD value is equal to the absolute value, minus 2, of the MVD value. As part of encoding the absolute remaining value of the MVD value, video encoder 200 may bypass encode a codeword representing the absolute remaining value of the MVD. The codeword includes the codeword prefix and the codeword suffix.

Figure 9:
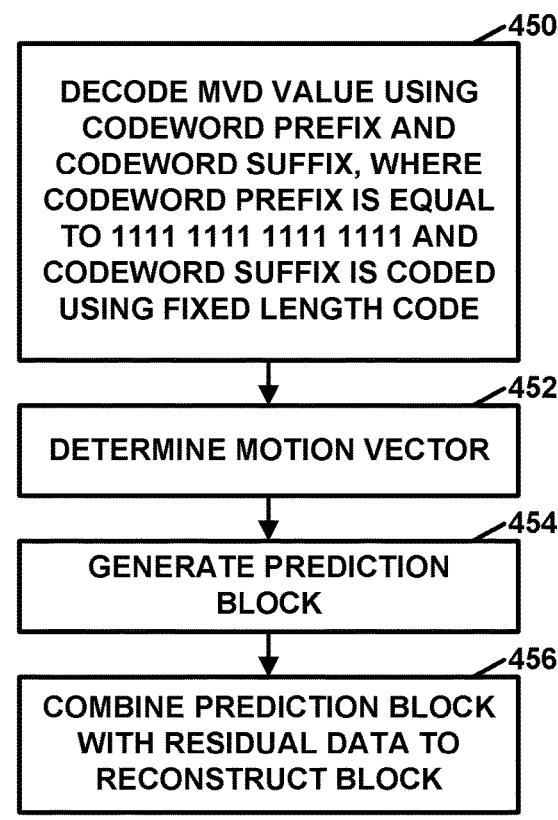
FIG. 9 is a flowchart illustrating an example method for decoding video data in accordance with one or more techniques of this disclosure.

FIG. 9 is a flowchart illustrating an example method for decoding video data in accordance with one or more techniques of this disclosure. In the example of FIG. 9, video decoder 300 (e.g., entropy decoding unit 302 of video decoder 300) may decode an MVD value using a codeword prefix and a codeword suffix (450). Based on an absolute value, minus 2, of the MVD value being 131070 or greater, the codeword prefix of the MVD value is equal to 1111 1111 1111 1111 and the codeword suffix is coded using a fixed-length code. The MVD value may be a horizontal or vertical component of an MVD that indicates a difference between a motion vector for a block of the video data and a predicted motion vector for the block. Alternatively, if the absolute value, minus 2, of the second MVD value is less than 131070, a codeword representing the MVD value is a first-order exponential Golomb codeword. In some examples, a maximum dynamic range of the MVD value is 17, regardless of a bit depth of the video data.

As part of coding the MVD value, video decoder 300 may decode a greater-than-0 value that indicates whether the MVD value is greater than 0. Based on the MVD value being greater than 0, video decoder 300 may decode a greater-than-1 value that indicates whether the MVD value is greater than 1. Additionally, video decoder 300 may decode an absolute remaining value of the MVD value. The absolute remaining value of the MVD value is equal to the absolute value, minus 2, of the MVD value. As part of decoding the absolute remaining value of the MVD value, video decoder 300 may bypass decode a codeword representing the absolute remaining value of the MVD. The codeword includes the codeword prefix and the codeword suffix.

Additionally, video decoder 300 (e.g., motion compensation unit 316 of video decoder 300) may determine, based on the MVD value and a predicted motion vector for a block of the video data, a motion vector for the block (452). Video decoder 300 may determine the predicted motion vector using AMVP, e.g., as described elsewhere in this disclosure. In some examples, video decoder 300 may determine the motion vector in part by determining a horizontal or vertical component of the motion vector by adding the MVD to a corresponding component of the motion vector predictor. Additionally, video decoder 300 (e.g., motion compensation unit 316 of video decoder 300) may generate a prediction block for the block based on the motion vector for the block (454). For instance, video decoder 300 may perform motion compensation, e.g., as described elsewhere in this disclosure, to determine the prediction block for the block. Video decoder 300 (e.g., reconstruction unit 310 of video decoder 300) may combine the prediction block with residual data to reconstruct the block (456). For example, video decoder 300 may add samples of the prediction block to corresponding samples of the residual data to reconstruct the block.

The following is a non-limiting list of examples that are in accordance with one or more techniques of this disclosure.

Example 1. A method of coding video data, the method comprising: coding a motion vector difference (MVD) value using a codeword prefix and a codeword suffix, wherein based on an absolute value, minus 2, of the MVD value being 131070 or greater, the codeword prefix of the MVD value is equal to 1111 1111 1111 1111 and the codeword suffix is coded using the fixed length code (resulting in a code that utilizing a truncated unary prefix code).

Example 2. A method of coding video data, the method comprising: coding a motion vector difference (MVD) value using a codeword prefix, wherein based on the an absolute value, minus 2, of MVD value being 131070, the codeword prefix of the MVD value is equal to 1111 1111 1111 1111 and no codeword suffix is coded.

Example 3. The method of any of examples 1-2, wherein coding includes decoding.

Example 4. The method of example 3, further comprising: determining, based on the MVD value and a predicted motion vector for a block of the video data, a motion vector for the block; determining a prediction block for the block based on the MVD value; and combining the prediction block with residual data to reconstruct the block.

Example 5. The method of any of examples 1-2, wherein coding includes encoding.

Example 6. The method of example 5, further comprising: determining a motion vector for a block of the video data; and determining the MVD value based on a difference between the motion vector for the block and a predicted motion vector for the block.

Example 7. A device for coding video data, the device comprising one or more means for performing the method of any of examples 1-6.

Example 8. The device of example 7, wherein the one or more means include one or more processors implemented in circuitry.

Example 9. The device of any of examples 7 and 8, further comprising a memory to store the video data.

Example 10. The device of any of examples 7-9, further comprising a display configured to display decoded video data.

Example 11. The device of any of examples 7-10, wherein the device includes one or more of a camera, a computer, a mobile device, a broadcast receiver device, or a set-top box.

Example 12. The device of any of examples 7-11, wherein the device includes a video decoder.

Example 13. The device of any of examples 7-12, wherein the device includes a video encoder.

Example 14. A computer-readable storage medium having stored thereon instructions that, when executed, cause one or more processors to perform the method of any of examples 1-6.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of coding video data, the method comprising:
coding a motion vector difference (MVD) value using a codeword prefix and a codeword suffix, wherein:
based on an absolute value, minus 2, of the MVD value being 131070 or greater, the codeword prefix of the MVD value is equal to and consists of 1111 1111 1111 1111 and the codeword suffix is coded using a fixed-length code, and
the MVD value is a horizontal or vertical component of an MVD that indicates a difference between a motion vector for a block of the video data and a predicted motion vector for the block.

2. The method of claim 1, wherein coding the MVD value using the codeword prefix and the codeword suffix comprises:
coding a greater-than-0 value that indicates whether the MVD value is greater than 0;
based on the MVD value being greater than 0, coding a greater-than-1 value that indicates whether the MVD value is greater than 1; and
coding an absolute remaining value of the MVD value, wherein the absolute remaining value of the MVD value is equal to the absolute value, minus 2, of the MVD value, and coding the absolute remaining value of the MVD value comprises bypass coding a codeword representing the absolute remaining value of the MVD, wherein the codeword includes the codeword prefix and the codeword suffix.

3. The method of claim 1, wherein a maximum dynamic range of the MVD value is 17, regardless of a bit depth of the video data.

4. The method of claim 1, wherein the MVD value is a first MVD value, the codeword prefix is a first codeword prefix, the codeword suffix is a first codeword suffix, and the method further comprises:
coding a second MVD value, wherein based on an absolute value, minus 2, of the second MVD value being less than 131070, a codeword representing the second MVD value is a first-order exponential Golomb codeword.

5. The method of claim 1, wherein coding the MVD value comprises decoding the MVD value.

6. The method of claim 5, further comprising:
determining, based on the MVD value and the predicted motion vector for the block of the video data, the motion vector for the block;
determining a prediction block for the block based on the motion vector for the block; and
combining the prediction block with residual data to reconstruct the block.

7. The method of claim 1, wherein coding the MVD value comprises encoding the MVD value.

8. The method of claim 7, further comprising:
determining the motion vector for the block; and
determining the MVD value based on the difference between the motion vector for the block and the predicted motion vector for the block.

9. A device for coding video data, the device comprising:
a memory to store the video data; and
one or more processors implemented in circuitry, the one or more processors configured to:
code a motion vector difference (MVD) value using a codeword prefix and a codeword suffix, wherein:
based on an absolute value, minus 2, of the MVD value being 131070 or greater, the codeword prefix of the MVD value is equal to and consists of 1111 1111 1111 1111 and the codeword suffix is coded using a fixed-length code, and
the MVD value is a horizontal or vertical component of an MVD that indicates a difference between a motion vector for a block of the video data and a predicted motion vector for the block.

10. The device of claim 9, wherein the one or more processors are configured such that, as part of coding the MVD value using the codeword prefix and the codeword suffix, the one or more processors:
code a greater-than-0 value that indicates whether the MVD value is greater than 0;
based on the MVD value being greater than 0, code a greater-than-1 value that indicates whether the MVD value is greater than 1; and
code an absolute remaining value of the MVD value, wherein the absolute remaining value of the MVD value is equal to the absolute value, minus 2, of the MVD value, and coding the absolute remaining value of the MVD value comprises bypass coding a codeword representing the absolute remaining value of the MVD, wherein the codeword includes the codeword prefix and the codeword suffix.

11. The device of claim 9, wherein a maximum dynamic range of the MVD value is 17, regardless of a bit depth of the video data.

12. The device of claim 9, wherein the MVD value is a first MVD value, the codeword prefix is a first codeword prefix, the codeword suffix is a first codeword suffix, and the one or more processors are further configured to:
code a second MVD value, wherein based on an absolute value, minus 2, of the second MVD value being less than 131070, a codeword representing the second MVD value is a first-order exponential Golomb codeword.

13. The device of claim 9, wherein coding the MVD value comprises decoding the MVD value.

14. The device of claim 13, wherein the one or more processors are further configured to:
determine, based on the MVD value and the predicted motion vector for the block of the video data, the motion vector for the block;
determine a prediction block for the block based on the motion vector for the block; and
combine the prediction block with residual data to reconstruct the block.

15. The device of claim 9, wherein coding the MVD value comprises encoding the MVD value.

16. The device of claim 15, wherein the one or more processors are further configured to:
- determine the motion vector for the block; and
- determine the MVD value based on the difference between the motion vector for the block and a predicted motion vector for the block.

17. The device of claim 9, further comprising a display configured to display decoded video data.

18. The device 9, wherein the device comprises one or more of a camera, a computer, a mobile device, a broadcast receiver device, or a set-top box.

19. A device for coding video data, the device comprising:
- means for storing the video data; and
- means for coding a motion vector difference (MVD) value using a codeword prefix and a codeword suffix, wherein:
  - based on an absolute value, minus 2, of the MVD value being 131070 or greater, the codeword prefix of the MVD value is equal to and consists of 1111 1111 1111 1111 and the codeword suffix is coded using a fixed-length code, and
  - the MVD value is a horizontal or vertical component of an MVD that indicates a difference between a motion vector for a block of the video data and a predicted motion vector for the block.

20. A non-transitory computer-readable storage medium having stored thereon instructions that, when executed, cause one or more processors to code a motion vector difference (MVD) value using a codeword prefix and a codeword suffix, wherein:
- based on an absolute value, minus 2, of the MVD value being 131070 or greater, the codeword prefix of the MVD value is equal to and consists of 1111 1111 1111 1111 and the codeword suffix is coded using a fixed-length code, and
- the MVD value is a horizontal or vertical component of an MVD that indicates a difference between a motion vector for a block of the video data and a predicted motion vector for the block.

* * * * *